Aug. 7, 1962 A. GUNTHER 3,048,218
DRUM DRIER FOR EVAPORATING SOLVENT FROM
A SOLUTION OF UNVULCANIZED RUBBER
Filed Sept. 23, 1958 3 Sheets-Sheet 2
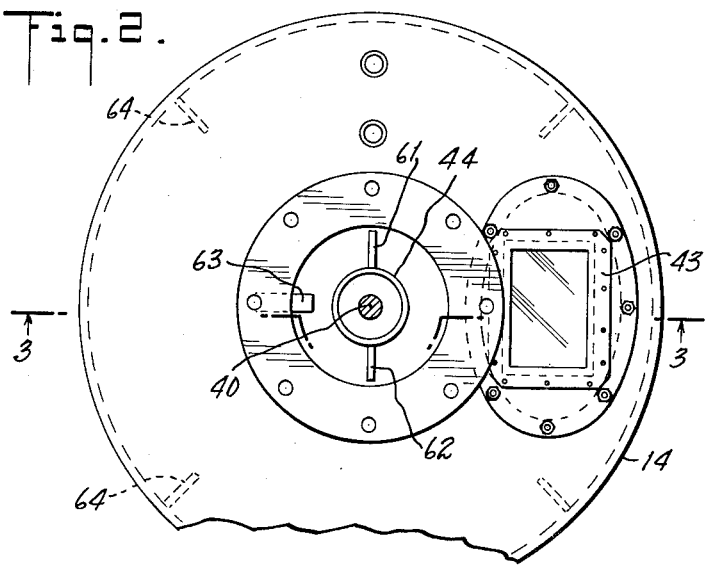
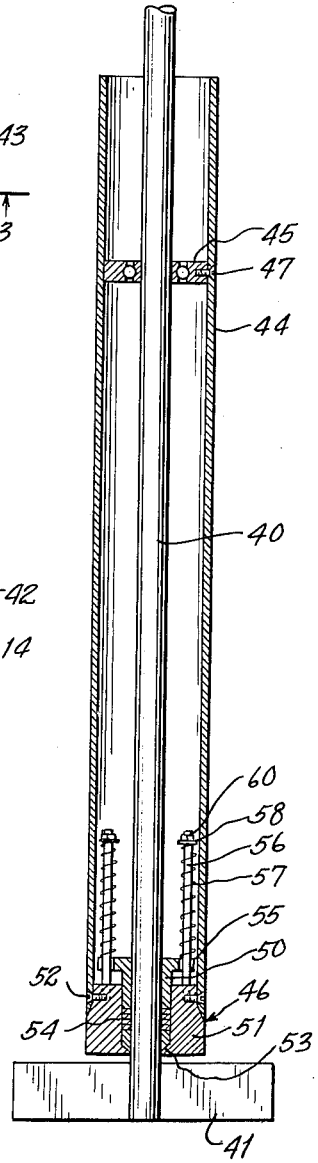
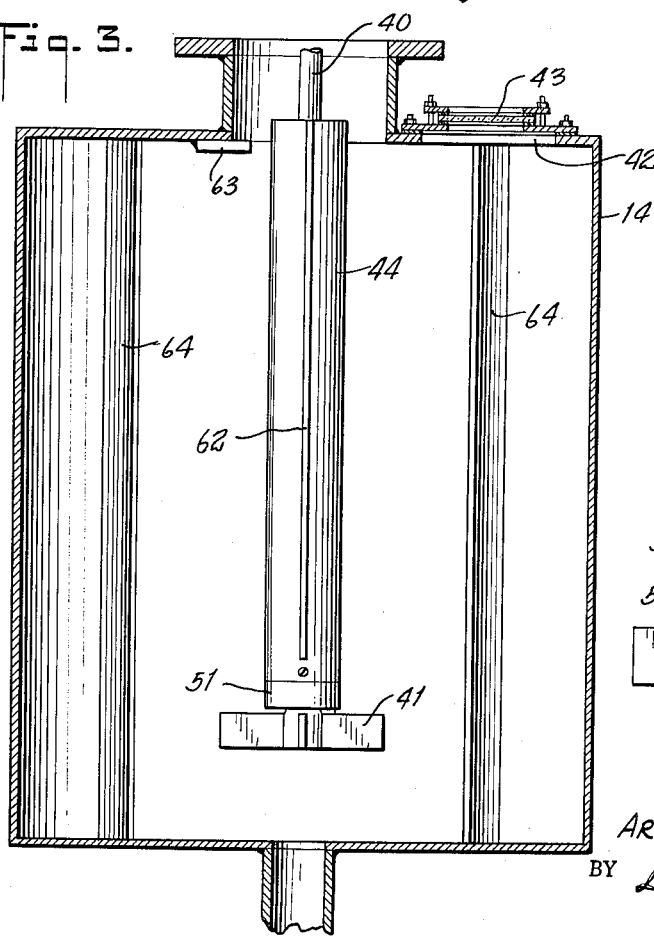
INVENTOR.
ARNOLD GUNTHER
BY Darby & Darby
ATTORNEYS

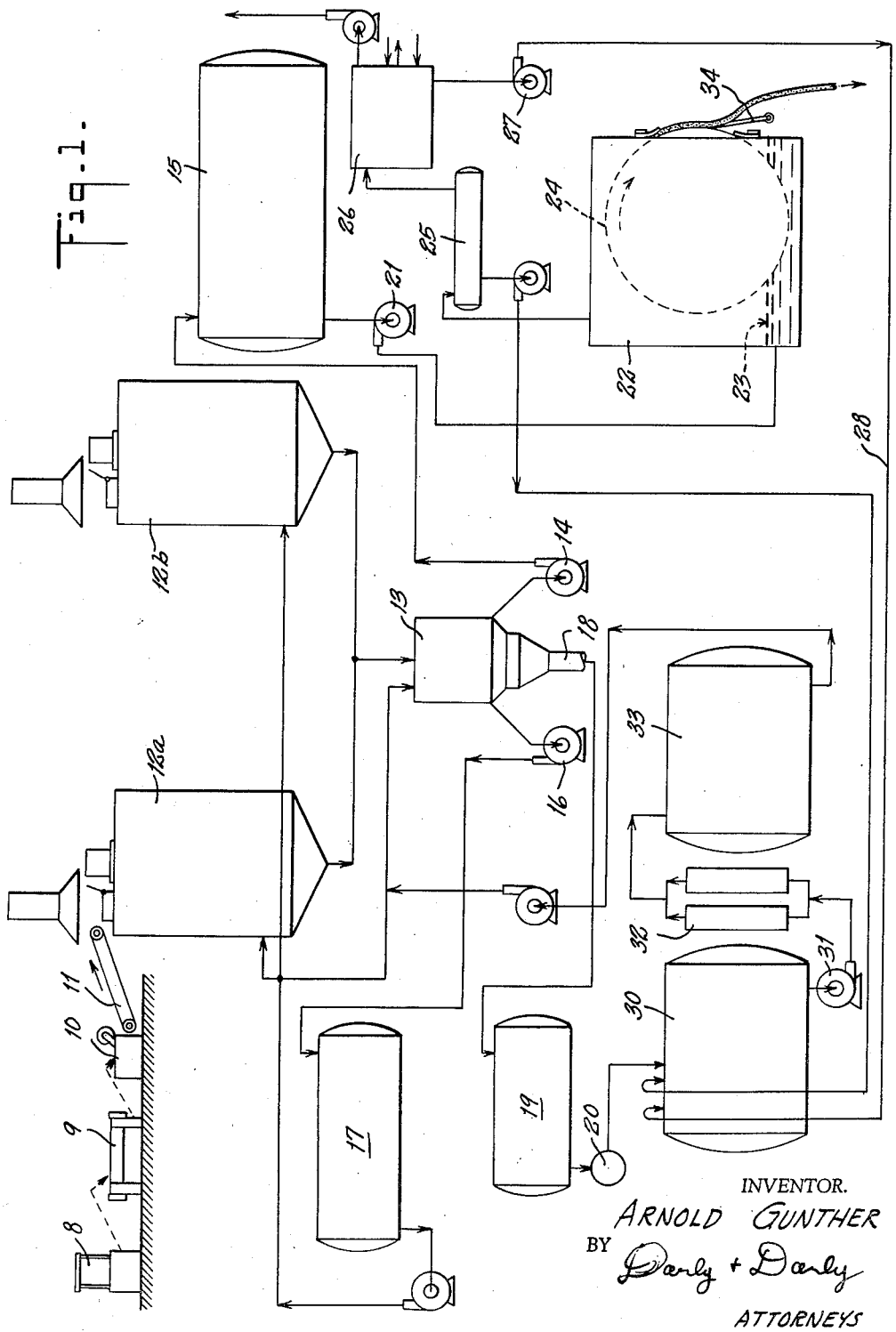

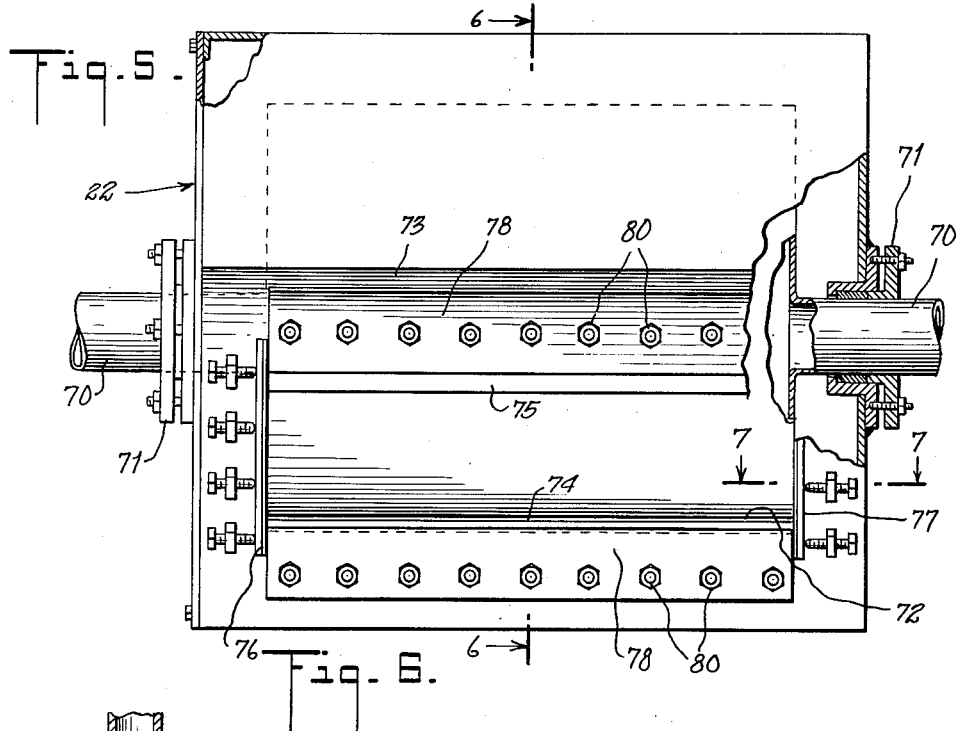
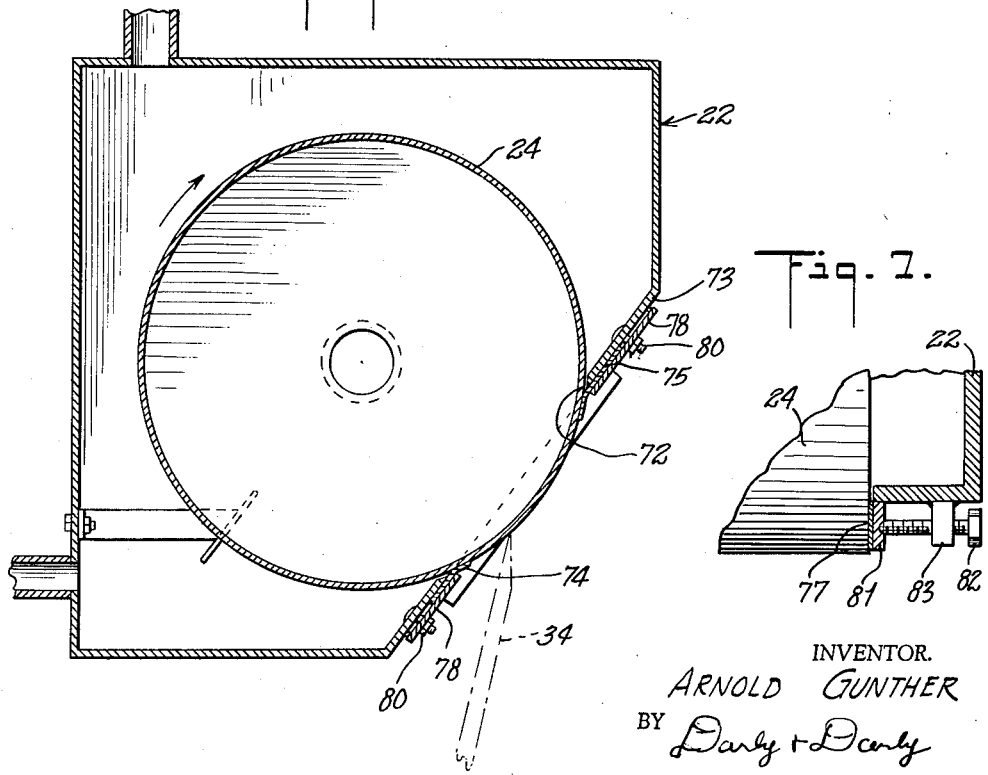

United States Patent Office 3,048,218
Patented Aug. 7, 1962

3,048,218
DRUM DRIER FOR EVAPORATING SOLVENT FROM A SOLUTION OF UNVULCANIZED RUBBER
Arnold Gunther, Newark, N.J., assignor, by mesne assignments, to Rubber & Fibre Chemical Corp., Brooklyn, N.Y., a corporation of New York
Filed Sept. 23, 1958, Ser. No. 762,769
3 Claims. (Cl. 159—12)

The present invention relates to a process for reclaiming unvulcanized rubber compound and the fibers contained therein from the scrap of rubber covered fiber pieces.

An example of this type is the remnants resulting from the manufacture of pneumatic tires. In such manufacture, fibers which may be of cotton, rayon or nylon, usually in the form of cords, are covered with rubber in its unvulcanized state, the pieces so formed being thereafter cut to size and shaped in a mold to form the completed tire. The scrap resulting from the cutting of the coated fiber pieces to tire size is the material from which the rubber and fibers are to be reclaimed by the process of the instant invention.

When reclaimed through the use of the process described hereinafter, the rubber compound is substantially identical in all its properties to the compound contained in the scrap before processing and contains the original mineral ingredients, oils, carbon black, sulphur, vulcanization accelerators, plasticizers, etc. This compound in the unvulcanized form present in the scrap is tacky, plastic and readily soluble in common rubber solvents.

Prior reclaiming procedures currently in use and known as acid or alkali reclaiming processes, for example, if applied to this particular type of scrap pieces, will result in a rubber compound whose properties will greatly differ from those of the original scrap. As an example, plasticity is decreased as is the tackiness and solubility. So far as can be determined, the reason for this change in properties with its detrimental effects on the reclaimed material is the fact that heat is applied for a considerable period of time, resulting in the vulcanization of the unvulcanized rubber compound. Although the continuous application of heat reverses the vulcanization and some plasticity is recovered, there is nevertheless a very considerable overall loss in plasticity. In addition, there are, as has been pointed out above, profound changes in the chemical structure of the compound which renders it different from the original compound and incapable of reuse for the original purpose.

It is therefore an object of this invention to provide a process for reclaiming an unvulcanized rubber compound from scrap pieces including the rubber compound and fibers without altering the rubber portion of the scrap.

It is another object of the invention to provide a reclaiming process which does not at any stage thereof utilize a sufficiently high temperature over a sufficient period of time to vulcanize or partially vulcanize the unvulcanized rubber scrap.

It is another object of the invention to provide a process for recovering rubber from scrap of the type mentioned which also yields fiber scrap which, with further processing by a method not here disclosed, yields a clean fiber scrap which may be utilized in the manufacture of new yarns or fabrics.

Other objects and features of the invention will be apparent when the following description is considered in connection with the annexed drawings, in which FIGURE 1 is a schematic diagram illustrating the various steps of the process of reclaiming rubber from rubber compound scrap of the type described above;

FIGURE 2 is a top plan view of an agitator wherein the comminuted scrap material, together with a solvent, is agitated in order to produce a solution of the unvulcanized rubber in the solvent;

FIGURE 3 is a longitudinal cross-sectional view of the agitator of FIGURE 2, the view being taken along the plane of the line 3—3 of FIGURE 2;

FIGURE 4 is a longitudinal cross-sectional view of the propeller used to agitate the mixture in the tank showing in particular the means for mounting the propeller in such a manner that the fibrous material is not wrapped about the propeller shaft;

FIGURE 5 is a front elevational view of a drum type drier utilized for evaporating the solvent from the dissolved rubber thus producing a sheet of rubber of substantially the same physical and chemical properties as that originally used to coat the fibers. In this view a portion of the cover is broken away in order to illustrate the construction and a portion of the drum is additionally broken away in order to illustrate the mode of supporting the drum in its casing;

FIGURE 6 is a transverse cross-sectional view of the drum of FIGURE 5, the view being taken on the plane of the line 6—6 of FIGURE 5; and FIGURE 7 is a detail sectional view on the plane of the line 7—7 of FIGURE 5 showing particularly the gasket which bears against the sides of the drum in the area in which the drum protrudes from its housing in order to prevent the escape of evaporated solvent.

Referring now to the drawings and particularly to FIGURE 1, there is shown at 8 a bale cutter in which the baled scrap pieces are cut into smaller pieces. At 9 there is schematically shown what is commonly termed a cracker which serves to further reduce the size of the pieces cut by the bale cutter and at 10 a rotary knife cutter which serves to further reduce the size of the pieces so that the ultimate pieces are a few square inches in area and of a variable thickness. The exact size of the piece is, of course, unimportant.

The pieces from the knife cutter 10 are fed by any suitable means such for example as the belt conveyor schematically indicated at 11 to a dissolver 12a. This dissolver 12a is duplicated by a similar dissolver 12b in order that the process may operate continuously, means not shown being provided to alternate the feed of the comminuted pieces to tank 12a or 12b. The tanks 12a and 12b are supplied with a suitable amount of a suitable rubber solvent such, for example, as benzene, toluene, xylene, petroleum naphthas, chlorinated solvents, etc. In order to accelerate the dissolution of the rubber portion of the scrap adequate agitation is essential and means for providing such agitation will be hereinafter described.

After the rubber compound portion of the scrap is completely dissolved in the solvent, the tank 12a or 12b as the case may be, is discharged into a centrifuge 13 from which the rubber in solution is pumped by means of any suitable pump, such as 14, to a rubber storage tank 15. The fibers remaining in the basket of the centrifuge are now washed with a spray of clean solvent and spun to extract the maximum possible amount of solvent, the washing solvent being then pumped by pump 16 to storage tank 17 from which it is taken for use in the dissolution of raw material as indicated in FIG. 1. The washed fibers are now discharged from the centrifuge basket through the usual nozzle 18 into a tank 19 in which they are steamed to strip out any remaining solvent, the water vapor and solvent being condensed in condenser 20 and then decanted and sent to a storage tank such as tank 30.

From the storage tank 18 the rubber in solution is pumped as, for example, by means of the pump 21 to the drum drier 22, the pump being operated at such a rate as to keep the level of the solution at a predetermined point such as that indicated at 23. The drum 24 of the drier 22 is steam heated and as the solution is picked up by the drum in its rotation the heat causes the solvent to be evaporated leaving a layer of substantially pure unvulcanized compound on the drum. Solvent in vapor form is then passed through a condenser 25, separated in the air separator 26 from any air which may be present therein, and pumped by means of a suitable pump such as 27 through the line 28 to the condensed solvent storage tank 30.

Since the solvent recovered by condensation will, particularly if chlorinated solvents are used, develop a high acid content as a result of the presence of water vapor in the aspirated air and also due to the humidity present in the raw material, the condensed solvent is pumped by means of a suitable pump 31 through the tower 32 and thence into the treated solvent tank 33. The tower 32 is filled with sodium hydroxide (NaOH) preferably in flake form. This passage of the solvent through the sodium hydroxide corrects the acidity and at the same time dries the condensed solvent, thus assuring that the solvent, when reused in the dissolver, will not coagulate or jellify.

The drum 24 is provided, as will be hereinafter described, with a scraper blade 34 which removes the sheet of rubber from the surface of the drum producing the material which is substantially identical to the unvulcanized rubber compound originally used to coat the fibers.

As has been indicated hereinabove, the dissolvers 12a and 12b are specially constructed to operate efficiently in the process outlined above. They are of the type in which propellers are utilized to agitate the mixture of rubber scrap and solvents although screw or turbine type agitators might be utilized.

Due to the presence of fibers, yarns or filaments in the solution, resulting of course from the type of scrap treated, the shafts of the agitating elements whether propellers, turbines or screws, tend, when of the usual type, to become wrapped with the fibrous material which build up in a layer on the shaft setting up stresses which eventually lead to a stoppage or breakdown. These stresses are in the main induced by the effect of unbalanced loads on the shaft due to the drag of the rather viscous solution on the wrapped fibers. Additionally, as the fibrous layer builds up a solid cylinder is formed which interferes with the proper action of the propellers resulting in a gradually decreased effectiveness of agitation.

The decreased effect of agitation will result in leaving many swollen pieces of scrap in the solution which is turn results in the fibers retaining so much rubber that the later reclaiming thereof is unsuccessful and in reduced efficiency of rubber reclamation due to the loss of these swollen pieces which were not dissolved. Moreover, the fact that dissolution of the rubber is not complete makes possible a clogging of the pipe lines from the dissolver to the centrifuge basket. The clogging of the lines and openings mentioned would, of course, result in loss of operating time due to the necessity of stopping the process and cleaning the pipes and openings.

In FIGURES 2, 3 and 4 there is shown a dissolver tank with its propeller type agitator which overcomes the disadvantages mentioned above and which makes the process outlined above possible to perform. Referring now to the figures mentioned, a dissolver tank 14 is shown in FIGURE 3 is cross-section. A shaft 40 is suitably supported in a manner not shown within a tank 14 extending substantially centrally thereof. At its lower end shaft 40 carries a propeller 41 which serves to agitate the mixture of solvent and rubber scrap which is present in the tank being placed therein through the opening 42 when the cover 43 is removed therefrom.

In prior constructions the shaft 40 has been open and exposed to the mixture with the result that as the shaft rotates the fibers tend to wrap thereabout as has been described thereabove. In the present instance I provide a casing 44 about the shaft 40, this casing being supported on the shaft by means of the upper and lower bearings 45 and 46 respectively. The upper bearing 45 is of a usual ball type, the outer race thereof being fixed to the casing 44 by means of screws such as that indicated at 47 and the inner race being press fitted in the usual manner to the shaft 40.

The lower bearing 46 is essentially composed of an outer bushing 51, the outer bushing 51 being fixed to the inner surface of the tube 44 by means of suitable screws such as 52. This bushing 51 is provided with a central aperture which terminates in a conically formed bottom as indicated at 53 and in the lower portion of the central opening a packing material 54 is placed. The construction thus provides a packing or stuffing box which prevents entry of the solution into the casing or tube 44 while at the same time permitting relative rotation between the shaft 40 and tube 44.

In order to keep the packing material under suitable pressure, the inner bushing member 50 is formed with a flange 55 which has openings extending axially near the periphery thereof. Fixed in the upper edge of outer bushing 51 are studs 56 which extend through the openings in the flange 55 and about which coil springs 57 are placed, the spring being compressed between flange 55 and washers 58 secured in place and bearing against the upper ends of springs 57 by means of the nuts 60. As indicated above, these springs must produce a desired pressure against the packing material and assure that it will be compressed into the conical bottom of the inner aperture of the outer bushing 51 to form the necessary seal.

It will be obvious that despite the bearings described, a slight torque will be exerted on the casing as the shaft 40 is rotated. However, the casing is prevented from rotating by means of longitudinally extending fins 61 and 62 one of which, after the shaft has rotated through approximately 90° from the position shown in FIGURES 2 and 3, will come into contact with a lug 63 fixed to the inner surface of the top of the dissolver tank 14. Once this position has been reached, the casing 44 cannot rotate with the shaft 40 irrespective of the direction of rotation thereof and the casing will remain stationary. The ribs or fins 61 not only cooperate with the member 63 to prevent rotation of the casing 44 but, more importantly, prevent a circular movement of the liquid around the tube 44 which would otherwise tend to cause wrapping of the fibers around the tube. As will be seen from the above the use of the tubular casing 44 about the shaft 40 overcomes the disadvantage brought about by the use of prior agitator arrangements having a shaft exposed to the solution and makes possible the use of an agitator in my improved process. As is customary, the tank 14 is provided with the inwardly extending ribs 64 which extend radially inwardly of the outer wall and create turbulence in the liquid in order to increase the effectiveness of the agitating movement set up by the propeller 41.

In describing the process reference was made to the use of a drum type drier. This type of drier, with modifications which will be hereinafter mentioned, has been selected because it is suitable for use in the process since evaporation of the solvent can be accomplished in a very short period of time thus permitting the application of heat to the rubber without changing the properties of the original rubber compound. If other types of evaporators such as those of the natural or forced convection type are utilized, the heating elements as, for example, coils will, after a very short interval of time, become coated with a rubber layer which, due to its low heat transfer coefficient, will prevent further evaporation of the solvent.

The drum drier used in the present process comprises the outer casing 22 within which a drum 24 is mounted, the drum being formed with shaft extensions 70 on either end which shaft extensions rotate in suitable stuffing boxes 71 in the housing 22. As is customary, the shaft extensions 70 are hollow and steam is admitted from a suitable reservoir through one extension and exhausted through the opposite extension or through use of a rotary joint may be admitted and exhausted at one side.

The housing 22 is provided with an opening generally indicated at 72 (FIGURES 5 and 6) which opening is formed in an inclined wall 73 of the housing 22, and through which opening a portion of the periphery of drum 24 extends. The opening 72 is sealed so that the evaporated solvent cannot leak out of the housing 22, such leakage being undesirable both because of the loss of solvent and, more particularly, because of the hazard to health and property, for example, by way of fire which might result.

The sealing means provided comprises the gasket members 74, 75, 76 and 77. Gasket members 74 and 75 which may, for example, be of asbestos are held between the edges of the opening 72 in casing 22 and clamping strips 78, the clamping strips being fastened to the casing by means of the screws 80. As will be seen, the lower gasket strip 74 bears directly against the peripheral surface of the drum 24 whereas the upper gasket 75 will, when the drum is in use, bear against the rubber layer of sheet which has been deposited on the drum 24. As shown, gasket 75 is bent when installed thus exerting a pressure against the rubber layer which pressure is of course increased by the vacuum present within the housing.

Gaskets 76 and 77 bear against the sides of the drum along the lines which form chords of the circular ends subtended by the portion of the periphery extending outside of housing 22.

As seen particularly in FIGURE 7, the gasket 77 is held against the circular end of the drum 24 by means of the pressure bar 81 which is supported in its adjusted position by means of the screws 82 extending through brackets 83 fixed to the sloped surface of housing 22.

As a result of the above-described modification of the drum construction, the solvent, when evaporated, is confined within the housing 22 and may, as has been described, be evacuated or pumped out of this container, condensed and reused. Th gaskets described prevent entry of any substantial amount of air into the housing and any small amount which may enter and become mixed with the solvent is unimportant since it may readily be removed and the solvent mixed therewith recovered if if desired in the manner indicated hereinabove.

The drum 22 rotates at a relatively low speed of the order of a few revolutions per minute. Since the layer of rubber picked up from the reservoir in the bottom of the drum remains on the drum only during a fraction of a single revolution, it is clear that the rubber compound will be subjected to the temperature of the drum for a period in the order of a small fraction of a minute. The temperature of the drum and the time during which the rubber compound is exposed thereto is thus so small that the properties of the rubber compound are not altered and the recovered rubber compound is substantially identical with the original compound.

As has been indicated, the thin layer of rubber which is deposited on the drum and from which the solvent is removed by evaporation at the temperature of the drum is removed from the drum at a point exterior of the housing by means of a scraper blade 34, the wedge-shaped end of which bears against the drum surface as is indicated in dashed lines in FIGURE 6. This scraper blade may, of course, be held in position by any suitable means such for example as by mounting it on a pivot and spring-urging the blade into position against the surface of the drum.

As is apparent from the above description, the process and apparatus described make it possible to reclaim rubber compound from scrap material consisting of fibers coated with the rubber compound without altering the original properties of the compound and in a simple and economical manner.

While I have described a preferred embodiment of my process and preferred apparatus for performing the process, it is to be understood that modifications may be made in both the process and the apparatus within the scope of my invention. I wish, therefore, to be limited not by the foregoing description, but on the other hand solely by the claims granted to me.

What is claimed is:

1. A drying device for evaporating solvent from a solution of unvulcanized scrap rubber compound, comprising in combination a housing, a drum horizontally mounted for rotation in said housing, a reservoir for rubber compound solution, said drum being mounted to dip into said reservoir during a portion of its rotation, means heating the interior of said drum to thereby evaporate solvent from the film of dissolved rubber compound, an opening in said housing, said drum being mounted so that a portion of the periphery thereof extends therethrough, flexible strips bearing against the cylindrical surface of the drum along arcs defined by the portions of the cylindrical surface of the drum that protrude from the housing, and substantially rigid members which press said strips against said cylindrical surface of said drum, said flexible strips consisting of a first substantially flexible strip, a first portion of which is clamped to the housing portion which forms the lower edge of the said opening in the housing, and a second portion of which is urged against the adjacent portion of the cylindrical surface of the drum by forces originating from the bending of said second strip portion by said cylindrical surface and a second substantially flexible strip, a first portion of which is clamped to the external portion of the housing forming the upper edge of the opening in the housing and a second portion of which is urged against the adjacent portion of the cylindrical surface of the drum by forces originating from the bending of the second portion of said strip, said flexible strips thereby sealing the opening to retain the evaporated solvent within said housing.

2. A drying device for evaporating solvent from a solution of unvulcanized scrap rubber compound, comprising in combination a housing, a drum horizontally mounted for rotation in said housing, a reservoir for rubber compound solution, said drum being mounted to dip into said reservoir during a portion of its rotation, means heating the interior of said drum to thereby evaporate solvent from the film of dissolved rubber compound, an opening in said housing, said drum being mounted so that a portion of the periphery thereof extends therethrough, flexible strips bearing against the cylindrical surface of the drum along arcs defined by the portions of the cylindrical surface of the drum that protrude from the housing, and substantially rigid members which press said strips against said cylindrical surface of said drum, said flexible strips consisting of a first substantially flexible strip, a first portion of which is clamped to the housing portion which forms the lower edge of the said opening in the housing, and a second portion of which is urged against the adjacent portion of the cylindrical surface of the drum by forces originating from the bending of said second strip portion by said cylindrical surface, and a second substantially flexible strip, a first portion of which is clamped to the external portion of the housing forming the upper edge of the opening in the housing and a second portion of which is urged against the adjacent portion of the cylindrical surface of the drum by forces originating from the bending of the second portion of said strip, said flexible strips thereby sealing the opening to retain the evaporated solvent within said housing, and scraper means bearing against the surface of the drum in the area between said upper and lower edge first and second flexible strips to remove the rubber in sheet form from said drum.

3. A drying device for evaporating solvent from a solution of unvulcanized scrap rubber compound, comprising in combination a housing, a drum horizontally mounted for rotation in said housing, a reservoir for rubber compound solution, said drum being mounted to dip into said reservoir during a portion of its rotation, means heating the interior of said drum to thereby evaporate solvent from the film of dissolved rubber compound, an opening in said housing, said drum being mounted so that a portion of the periphery thereof extends therethrough, flexible strips bearing against the cylindrical surface of the drum along arcs defined by the portions of the cylindrical surface of the drum that protrude from the housing, and substantially rigid members which press said strips against said cylindrical surface of said drum, said flexible strips consisting of a first substantially flexible strip, a first portion of which is clamped to the housing portion which forms the lower edge of the said opening in the housing, and a second portion of which is urged against the adjacent portion of the cylindrical surface of the drum by forces originating from the bending of said second strip portion by said cylindrical surface and a second substantially flexible strip, a first portion of which is clamped to the external portion of the housing forming the upper edge of the opening in the housing and a second portion of which is urged against the adjacent portion of the cylindrical surface of the drum by forces originating from the bending of the second portion of said strip, said flexible strips thereby sealing the opening to retain the evaporated solvent within said housing, and means for exhausting the evaporated solvent from said housing, said means comprising an additional opening in said housing adapted for connection to an exhaust fan.

References Cited in the file of this patent

UNITED STATES PATENTS

| | | |
|---|---|---|
| 1,318,464 | Schweizer | Oct. 14, 1919 |
| 1,421,364 | Allen | July 4, 1922 |
| 1,424,668 | Navone | Aug. 1, 1922 |
| 1,641,598 | Miller | Sept. 6, 1927 |
| 2,868,722 | Brooks et al. | Jan. 13, 1959 |
| 2,886,101 | Overton | May 12, 1959 |
| 2,921,038 | Gunther | Jan. 12, 1960 |
| 2,959,539 | Duval | Nov. 8, 1960 |

FOREIGN PATENTS

| | | |
|---|---|---|
| 784,682 | Great Britain | Oct. 16, 1957 |
| 167,667 | Great Britain | Aug. 18, 1921 |
| 147,628 | Great Britain | May 19, 1921 |
| 1,095,547 | France | June 3, 1955 |
| 324,254 | Germany | Aug. 24, 1920 |

UNITED STATES PATENT OFFICE
CERTIFICATE OF CORRECTION

Patent No. 3,048,218                                August 7, 1962

Arnold Gunther

It is hereby certified that error appears in the above numbered patent requiring correction and that the said Letters Patent should read as corrected below.

Column 3, line 47, for "is" read -- in --; column 4, line 6, after "an" insert -- inner bushing 50 and an --; column 5, line 19, for "of" read -- or --.

Signed and sealed this 19th day of February 1963.

(SEAL)
Attest:

ESTON G. JOHNSON
Attesting Officer

DAVID L. LADD
Commissioner of Patent